US010202741B2

(12) United States Patent
Kang et al.

(10) Patent No.: US 10,202,741 B2
(45) Date of Patent: Feb. 12, 2019

(54) CLOSED-CIRCUIT HYDRAULIC SYSTEM FOR CONSTRUCTION MACHINE

(71) Applicant: Doosan Infracore Co., Ltd., Incheon (KR)

(72) Inventors: Byung Il Kang, Incheon (KR); Ki Hwan Hong, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 170 days.

(21) Appl. No.: 15/106,322

(22) PCT Filed: Dec. 12, 2014

(86) PCT No.: PCT/KR2014/012266
§ 371 (c)(1),
(2) Date: Jun. 20, 2016

(87) PCT Pub. No.: WO2015/093791
PCT Pub. Date: Jun. 25, 2015

(65) Prior Publication Data

US 2016/0333552 A1 Nov. 17, 2016

(30) Foreign Application Priority Data

Dec. 20, 2013 (KR) ........................ 10-2013-0159998
Mar. 11, 2014 (KR) ........................ 10-2014-0028127

(51) Int. Cl.
*F16D 31/02* (2006.01)
*E02F 9/22* (2006.01)
(Continued)

(52) U.S. Cl.
CPC .......... *E02F 9/2289* (2013.01); *E02F 9/2203* (2013.01); *E02F 9/2217* (2013.01);
(Continued)

(58) Field of Classification Search
CPC .......... F15B 1/033; F15B 7/001; F15B 7/003; F15B 11/17; F15B 21/08; E02F 9/2217
See application file for complete search history.

(56) References Cited

U.S. PATENT DOCUMENTS 3,934,416 A * 1/1976 Goldkuhle .............. F15B 11/17 60/484
4,369,625 A * 1/1983 Izumi .................... E02F 9/2292 60/421
(Continued)

FOREIGN PATENT DOCUMENTS

JP 05-196003 A 8/1993
JP 06-313403 A 11/1994
(Continued)

OTHER PUBLICATIONS

International Search Report for PCT/KR2014/012266 dated Feb. 6, 2015.

*Primary Examiner* — Michael Leslie
(74) *Attorney, Agent, or Firm* — Hauptman Ham, LLP

(57) ABSTRACT

The present disclosure relates to a closed circuit hydraulic system for a construction machine including a plurality of actuators and a plurality of hydraulic pumps selectively supplying working oil to the plurality of actuators bidirectionally and the closed circuit hydraulic system includes: a charge line selectively connected with a low-pressure side hydraulic line which returns to the hydraulic pump from the actuator among hydraulic lines connecting the hydraulic pumps and the actuators; a charge pump supplying a supplement flow to the charge line; and a variable relief valve selectively changing a normal mode to limit a pressure of the charge line to a predetermined pressure or less and a boost mode to limit the pressure of the charge line to a pressure lower than the pressure of the charge line in the normal mode.

2 Claims, 5 Drawing Sheets

(51) Int. Cl.

| | |
|---|---|
| ***F15B 21/08*** | (2006.01) |
| ***F15B 11/17*** | (2006.01) |
| ***F15B 1/02*** | (2006.01) |
| ***F15B 1/027*** | (2006.01) |
| ***F15B 7/00*** | (2006.01) |
| *F15B 1/033* | (2006.01) |

(52) U.S. Cl.

CPC .......... *E02F 9/2225* (2013.01); *E02F 9/2228* (2013.01); *E02F 9/2285* (2013.01); *E02F 9/2292* (2013.01); *E02F 9/2296* (2013.01); *F15B 1/024* (2013.01); *F15B 1/027* (2013.01); *F15B 7/001* (2013.01); *F15B 7/003* (2013.01); *F15B 7/006* (2013.01); *F15B 11/17* (2013.01); *F15B 21/08* (2013.01); *F15B 1/033* (2013.01); *F15B 2211/20546* (2013.01); *F15B 2211/20561* (2013.01); *F15B 2211/20569* (2013.01); *F15B 2211/20576* (2013.01); *F15B 2211/27* (2013.01); *F15B 2211/50518* (2013.01); *F15B 2211/515* (2013.01); *F15B 2211/526* (2013.01); *F15B 2211/55* (2013.01); *F15B 2211/613* (2013.01); *F15B 2211/625* (2013.01); *F15B 2211/6346* (2013.01); *F15B 2211/6658* (2013.01); *F15B 2211/7135* (2013.01)

(56) References Cited

U.S. PATENT DOCUMENTS

| | | | | | |
|---|---|---|---|---|---|
| 4,395,878 | A * | 8/1983 | Morita | B60W 30/18 | 60/488 |
| 4,475,332 | A * | 10/1984 | Anderson | F16H 61/40 | 60/329 |
| 7,231,765 | B2 * | 6/2007 | Kawamura | F04B 1/22 | 60/488 |
| 2011/0030364 | A1 * | 2/2011 | Persson | F15B 21/08 | 60/486 |

FOREIGN PATENT DOCUMENTS

| | | | |
|---|---|---|---|
| JP | 2002-054602 | A | 2/2002 |
| JP | 2008-025159 | A | 2/2008 |
| JP | 2008-032198 | A | 2/2008 |
| KR | 10-2012-0123109 | A | 11/2012 |

* cited by examiner

CLOSED-CIRCUIT HYDRAULIC SYSTEM FOR CONSTRUCTION MACHINE

CROSS REFERENCE TO RELATED APPLICATION

This application claims the priority of Korean Patent Application No. 10-2013-0159998 filed Dec. 20, 2013 and the priority of Korean Patent Application No. 10-2014-0028127 filed Mar. 11, 2014 in the Korean Intellectual Property Office. Further, this application is the National Phase application of International Application No. PCT/KR2014/012266 filed Dec. 12, 2014, which designates the United States and was published in Korean.

TECHNICAL FIELD

The present disclosure relates to a closed circuit hydraulic system for a construction machine, and more particularly, to a closed circuit hydraulic system for a construction machine, which implements a boosting function.

BACKGROUND ART

In general, a construction machine such as an excavator supplies working oil to an actuator such as a hydraulic cylinder or a hydraulic motor to drive a working device such as a boom, an arm, a bucket, or an upper swing body.

In this case, a driving direction of the working device is controlled by a main control valve (MCV). In more detail, the working oil discharged from the hydraulic pump is supplied to each actuator while a flow direction of the working oil is controlled through the main control valve converted according to a work signal of an operating unit such as a joystick or a pedal, and as a result, driving each actuator is controlled.

That is, a plurality of spools is provided in the interior of the main control valve and a plurality of actuators is connected to the exterior of the main control valve, and when a worker generates a request pressure value which is a flow control signal in the operating unit which is a flow request unit such as the joystick or the pedal, the request pressure value is provided to the main control valve and a pump control device and a specific spool is opened/closed by the request pressure value in the main control valve, and as a result, the working oil is provided to the actuator associated with the corresponding spool by the opening/closing operation of the corresponding spool.

Meanwhile, a boosting function in the construction machine such as the excavator as a function to increase thrust of a cylinder by increasing a pressure of a hydraulic system is used when large force is temporarily required during working.

For example, there is a case in which a large rock needs to be excavated and a lot of soil needs to be put in the bucket unexpectedly while excavating stones having a relatively small size in a quarry and in this case, a boosting button is pressed, which is provided in the joystick, and the like that is configured to implement the boosting function in order to temporarily exert the large force.

FIG. 1 is a diagram illustrating a hydraulic system for a construction machine having a boosting function in the related art. A method that implements the boosting function in the hydraulic system for a construction machine in the related art will be described with reference to FIG. 1.

Referring to FIG. 1, in the hydraulic system for a construction machine in the related art, two main pumps 10 are provided and the working oil discharged from the main pumps 10 is provided to a main control valve 20. When a specific spool is actuated in the main control valve 20, the working oil is provided to an actuator (not illustrated) associated with the corresponding spool, and as a result, the actuator that receives the working oil performs desired work.

In addition, a main relief valve 30 is provided between discharge lines 12 connecting the main pumps 10 and the main control valve 20 to each other and a shuttle valve 40 is connected to the discharge line 12 in parallel.

Herein, the main relief valve 30 in which a desired maximum pressure is set serves to stabilize a maximum pressure of the hydraulic system by discharging some of the working oil when the maximum pressure is formed in the working oil in the hydraulic system.

In the hydraulic system, when the worker operates a button attached to a joystick 50, and the like in order to implement the boosting function, a valve 70 connected to a pilot pump 60 is switched and opened and the pressure of the pilot pump 60 is input into the main relief valve 30 and the set pressure increases to increase the pressure of the entire hydraulic system, and as a result, thrust or torque of each actuator increases.

Meanwhile, in the hydraulic system of the traditional construction machine, energy loss of the working oil of approximately 55% occurs due to loss such as pressure loss, and the like while the working oil passes through the main control valve. Due to such a reason, in recent years, a system has been developed, which configures a closed circuit by deleting the main control valve and directly connecting the hydraulic pump to each of the plurality of actuators and controls a swash plate angle of the hydraulic pump to control the flow direction of the working oil provided to the actuator.

In the construction machine constituted by the closed circuit hydraulic system, the hydraulic pump is allocated to each actuator and for example, when a separate direction switch valve, and the like are not used, a total of 7 hydraulic pumps are provided in order to drive the boom, the arm, the bucket, the upper swing body, left and right carriages, and an option device.

However, in order to implement the boosting function in the construction machine constituted by the closed circuit hydraulic system, since the relief valves need to be used in all of respective pumps similarly to application to the hydraulic system in the related art and control signals for controlling the plurality of relief valves increase, excessive increase of parts and cost and complexity of the hydraulic system are caused.

DISCLOSURE

Technical Problem

The present disclosure is contrived to solve the problem and an object of the present disclosure is to provide a closed circuit hydraulic system for a construction machine which can easily implement a boosting function to increase thrust or torque of each actuator by using one variable relief valve in a construction machine constituted by the closed circuit hydraulic system.

TECHNICAL SOLUTION

In order to achieve the object, according to the present disclosure, a closed circuit hydraulic system for a construction machine including a plurality of actuators and a plurality of hydraulic pumps selectively supplying working oil to the plurality of actuators bidirectionally, includes: a charge line selectively connected with a low-pressure side hydraulic line which returns to the hydraulic pump from the actuator among hydraulic lines connecting the hydraulic pumps and the actuators; a charge pump supplying a supplement flow to the charge line; and a variable relief valve selectively changing a normal mode to limit a pressure of the charge line to a predetermined pressure or less and a boost mode to limit the pressure of the charge line to a pressure lower than the pressure of the charge line in the normal mode.

In addition, the closed circuit hydraulic system for a construction machine may further include a pair of pilot check valves installed on the hydraulic lines in parallel so that the low-pressure side hydraulic line is in communication with the charge line by receiving a pilot signal from a high-pressure side hydraulic line among the hydraulic lines.

Further, the closed circuit hydraulic system for a construction machine may further include a control unit changing a set pressure of the variable relief valve.

Moreover, the closed circuit hydraulic system for a construction machine may further include an accumulator provided on the charge line and storing an excessive flow among the supplement flow discharged from the charge pump or supplying an insufficient flow to the hydraulic lines connecting the hydraulic pumps and the actuators.

Besides, the accumulator may include a first accumulator storing the excessive flow among the supplement flow discharged from the charge pump or supplying the insufficient flow to the hydraulic line in the normal mode, and a second accumulator storing the excessive flow among the supplement flow discharged from the charge pump or supplying the insufficient flow to the hydraulic line in the boost mode, and having a lower discharge pressure than the first accumulator.

In addition, the closed circuit hydraulic system for a construction machine may further include a direction switch valve controlled by the control unit so as to supply the supplement flow discharged from the charge pump to the first accumulator or the second accumulator.

Advantageous Effects

According to the present disclosure, in a construction machine constituted by a closed circuit hydraulic system, a boosting function to increase thrust or torque of each actuator can be implemented by using one variable relief valve, and as a result, the hydraulic system is simplified to save parts and cost.

In addition, when the boosting function is implemented in the closed circuit hydraulic system of the present disclosure, a maximum pressure of the hydraulic system is not increased but force applied in an opposite direction to a driving direction of the actuator is reduced to increase the thrust or torque of each actuator, and as a result, the life-span of the parts can be improved.

BEST MODE

Figure 1:
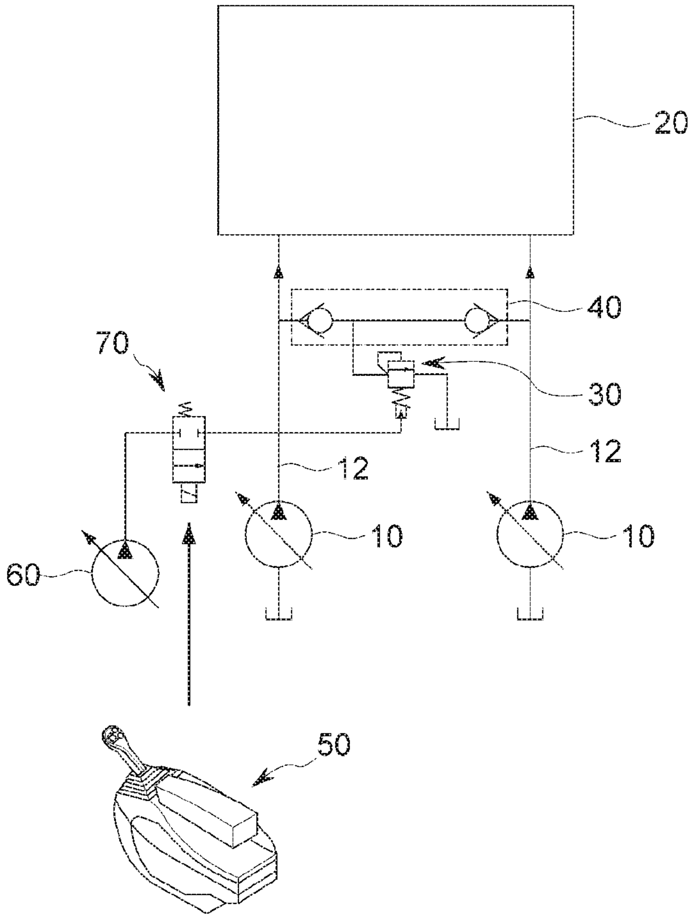
FIG. 1 Prior Art
FIG. 1 is a diagram illustrating a hydraulic system for a construction machine having a boosting function in the related art.

Hereinafter, exemplary embodiments of the present disclosure will be described in detail with reference to the accompanying drawings. In this process, sizes or shapes of constituent elements illustrated in the drawings, and the like may be exaggerated for clarity and ease of description. In addition, the terms, which are specially defined in consideration of configurations and operations of the present disclosure, may vary depending on the intention or usual practice of a user or an operator. These terms should be defined based on the content throughout the present specification. Further, the spirit of the present disclosure is not limited to the suggested exemplary embodiment, those skilled in the art who understand the spirit of the present disclosure may easily carry out other exemplary embodiments within the scope of the same spirit, and of course, the exemplary embodiments also belong to the scope of the present disclosure.

Figure 2:
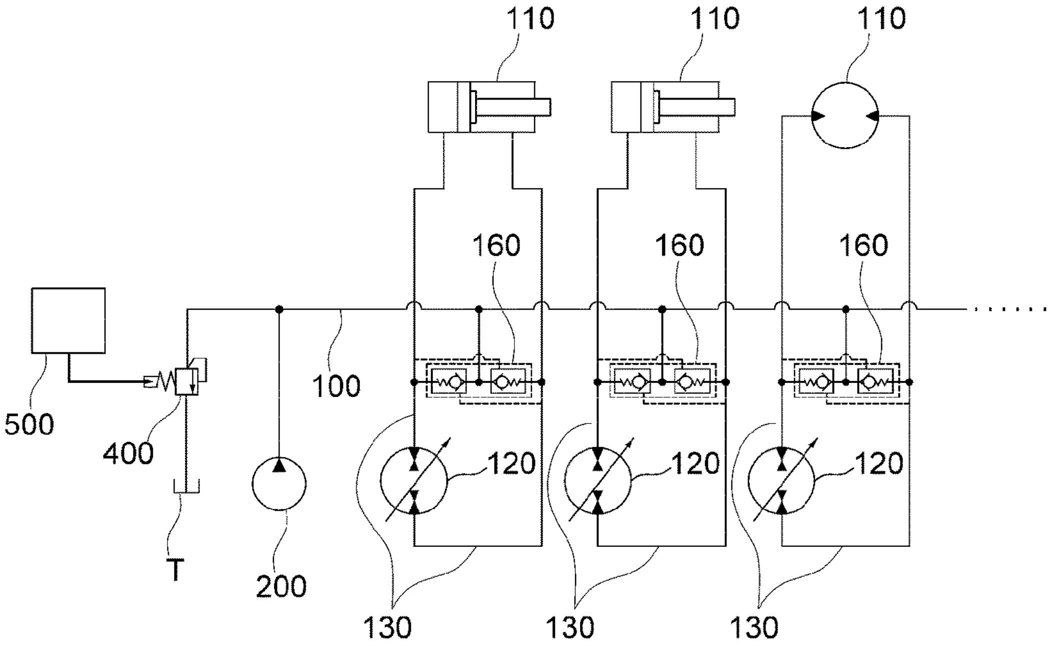
FIG. 2 is a diagram illustrating a closed circuit hydraulic system for a construction machine according to an exemplary embodiment of the present disclosure.

FIG. 2 is a diagram illustrating a closed circuit hydraulic system for a construction machine according to an exemplary embodiment of the present disclosure. Referring to FIG. 2, a configuration of the closed circuit hydraulic system will be described in detail.

The closed circuit hydraulic system for a construction machine as a system in which a plurality of actuators 110 including a boom, an arm, a bucket, an upper swing body, left and right carriages, and an option device is connected to a plurality of hydraulic pumps 120, respectively to configure a closed circuit and a flow and a flow direction of working oil provided to each actuator 110 are controlled by controlling a swash plate angle of each hydraulic pump 120 is configured to include a charge line 100, a charge pump 200, a variable relief valve 400, a pilot check valve 160, a control unit 500, and the like.

The charge line 100 which is selectively connected with a low-pressure side hydraulic line 130 which returns to the hydraulic pump 120 from the actuator 110 among hydraulic lines 130 connecting the hydraulic pumps 120 and the actuators 110 serves to supply an insufficient flow by a difference in cylinder dimension among the actuators 110 to the hydraulic line 130 or discharge an excessive flow of the hydraulic line 130 due to a characteristic of the closed circuit hydraulic system.

The charge pump 200 discharges a supplement flow and supplies the discharged supplement flow to the charge line 100 and the variable relief valve 400 selectively changes a mode so that the construction machine operates in a normal mode or a boost mode.

That is, the variable relief valve 400 limits the pressure of the charge line 100 to a predetermined pressure or less when the construction machine operates in the normal mode and according to the exemplary embodiment of the present disclosure, the variable relief valve 400 operates at a pressure of approximately 20 to 30 bar in the normal mode.

Meanwhile, there is a case in which the construction machine such as the excavator, or the like needs to excavate a large rock or pun a lot of soil in the bucket unexpectedly while excavating stones having a relatively small size in a quarry and in this case, a boosting button is pressed, which is provided in the joystick, and the like that is configured to implement the boosting function in order to temporarily exert the large force.

In this case, the variable relief valve 400 changes a set pressure of the charge line 100 to a lower pressure than the set pressure in the normal mode to implement the boost mode.

That is, the charge line 100 is connected to the low-pressure side hydraulic line 130 among the hydraulic lines and the variable relief valve 400 increases thrust of a cylinder or torque of a hydraulic motor by reducing a pressure applied in an opposite direction to an actuation direction of the cylinder or hydraulic motor that actuates each actuator 110 to implement a boosting function and according to the exemplary embodiment of the present disclosure, the variable relief valve 400 operates at a pressure less than approximately 10 bar in the boost mode.

One pair of pilot check valves 160 which are connected to the hydraulic line 130 in parallel receive a pilot signal of a high-pressure side hydraulic line 130 among the hydraulic lines 130 to connect the low-pressure side hydraulic line 130 to the charge line 100.

Accordingly, according to the set pressure of the variable relief valve 400, the low-pressure side hydraulic line 130 between the charge line 100 and the hydraulic line 130 maintains the same pressure.

The control unit 500 changes the set pressure of the variable relief valve 400 according to a control signal generated when a worker operates an operating unit such as the joystick or a pedal. That is, when the worker intends to change the normal mode to the boost mode, the control unit 500 controls the variable relief valve 400 according to a boosting operation of the worker.

Figure 3:
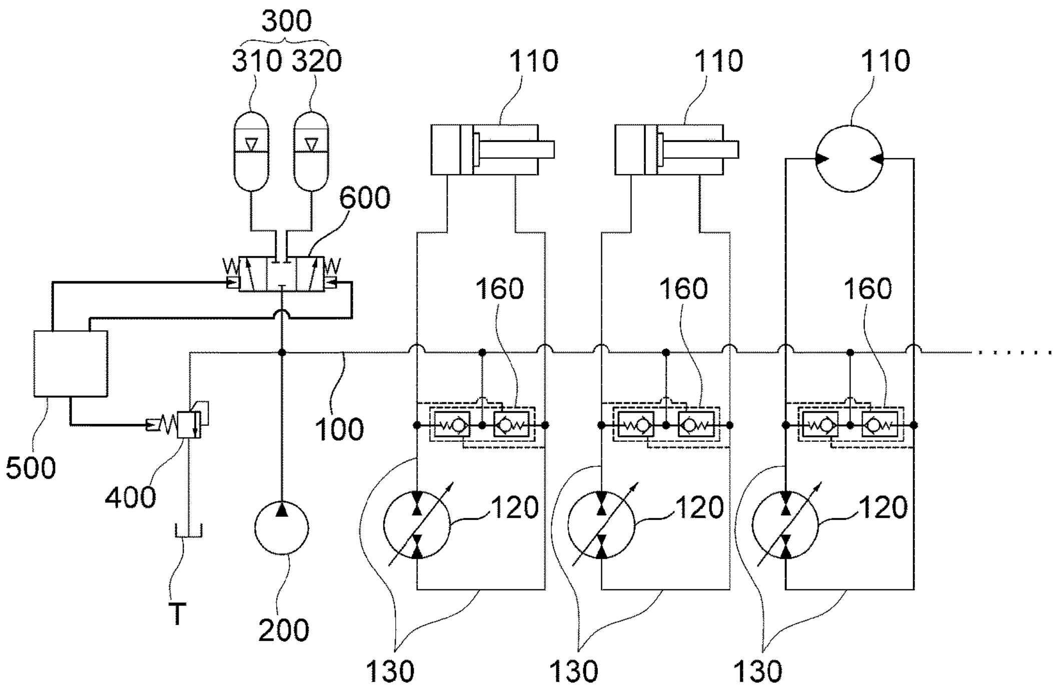
FIG. 3 is a diagram illustrating a closed circuit hydraulic system for a construction machine according to another exemplary embodiment of the present disclosure.

FIG. 3 is a diagram illustrating a closed circuit hydraulic system for a construction machine according to another exemplary embodiment of the present disclosure. A configuration of the closed circuit hydraulic system is described in detail with reference to FIG. 3, and description of the same configuration as the closed circuit hydraulic system according to the exemplary embodiment of the present disclosure will be omitted.

The closed circuit hydraulic system according to another exemplary embodiment of the present disclosure is configured to further include an accumulator 300 and a direction switch valve 600 as illustrated in FIG. 3 and the accumulator 300 is provided on the charge line 100 to store an excessive flow among the supplement flow discharged from the charge pump 200 or supply an insufficient flow to the hydraulic line 130.

That is, the supplement flow discharged from the charge pump 200 is supplied to the accumulator 300 and the excessive flow among the supplement flow supplied to the accumulator 300 is discharged to a tank T through the variable relief valve 400, and as a result, the charge line 100 is maintained at the set pressure of the variable relief valve 400.

In detail, the accumulator 300 is configured to include a first accumulator 310 and a second accumulator 320 and in the normal mode, the supplement flow discharge from the charge pump 200 is supplied to the first accumulator 310 and in the boost mode, the supplement flow discharged from the charge pump 200 is supplied to the second accumulator 320.

That is, the first accumulator 310 stores the excessive flow among the supplement flow discharged from the charge pump 200 or supplies the insufficient flow to the hydraulic line 130 in the normal mode and the second accumulator 320 stores the excessive flow among the supplement flow discharged from the charge pump 200 or supplies the insufficient flow to the hydraulic line 130 and has a lower discharge pressure than the first accumulator 310 in the boost mode.

According to another exemplary embodiment of the present disclosure, since the set pressure of the variable relief valve 400 in the normal mode is higher than the set pressure of the variable relief valve 400 in the boost mode, the accumulator 300 is divided into the high-pressure first accumulator 310 and the low-pressure second accumulator 320 and the control unit 500 reduces the set pressure of the variable relief valve 400 and supplies the supplement flow discharged from the charge pump 200 to the second accumulator 320 in the boost mode.

The direction switch valve 600 controls a flow direction of the supplement flow so that the supplement flow discharged from the charge pump 200 is supplied to the first accumulator 310 or the second accumulator 320 and the control unit 500 controls the direction switch valve 600.

In detail, in the normal mode, the control unit 500 sets the set pressure of the variable valve 400 to approximately 20 to 30 bar which is a predetermined pressure and controls the direction switch valve 600 so as to supply the supplement flow discharged from the charge pump 200 to the first accumulator 310.

On the contrary, in the boost mode, the control unit 500 sets the set pressure of the variable relief valve 400 to a pressure less than approximately 10 bar which is lower than the predetermined pressure and controls the direction switch valve 600 so as to supply the supplement flow discharged from the charge pump 200 to the second accumulator 320.

Figure 4:
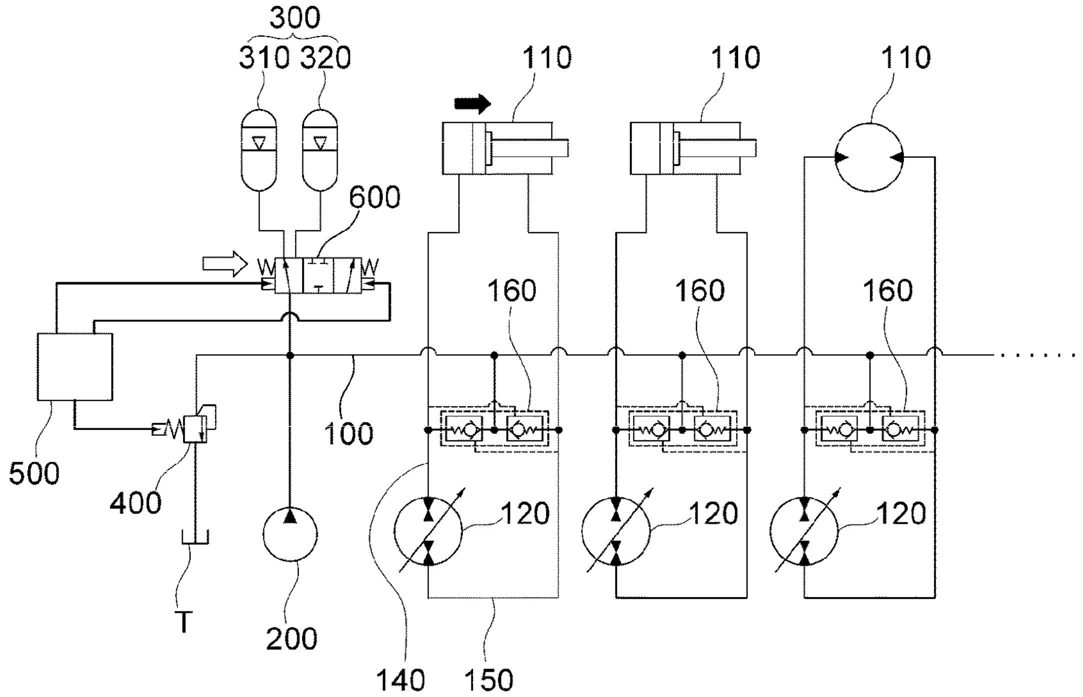
FIGS. 4 and 5 are diagrams illustrating an operating state of a closed circuit hydraulic system for a construction machine according to another exemplary embodiment of the present disclosure.
Figure 5:
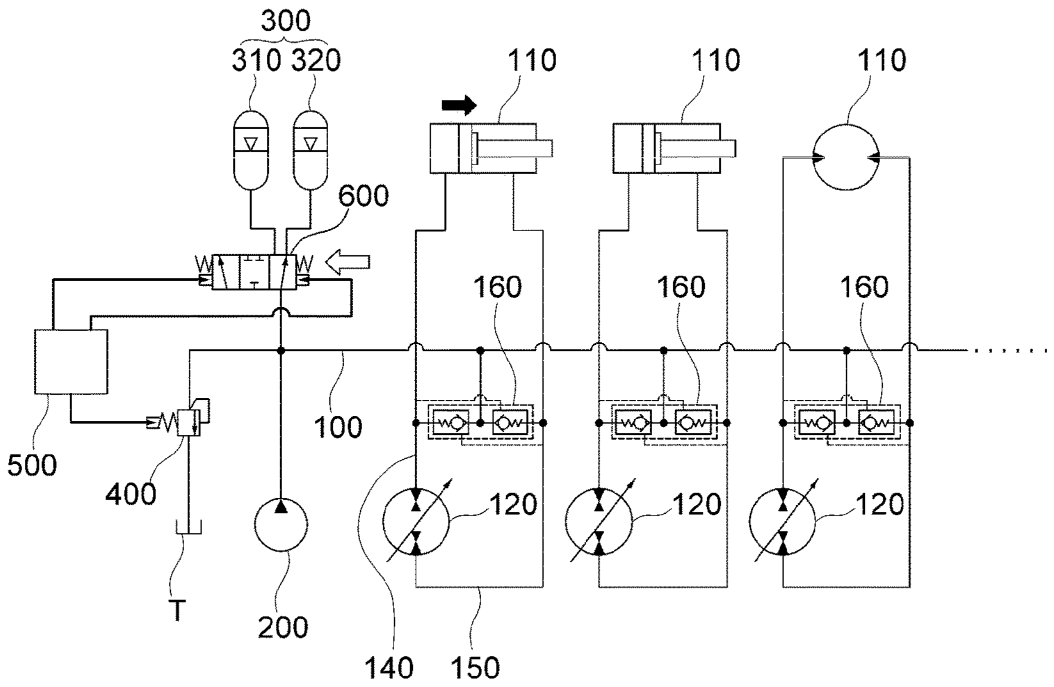

FIGS. 4 and 5 are diagrams illustrating an operating state of a closed circuit hydraulic system for a construction machine according to an exemplary embodiment of the present disclosure. An operating process of implementing the boosting function in the closed circuit hydraulic system will be described in detail with reference to FIGS. 4 and 5.

FIG. 4 is a diagram illustrating a state in which the cylinder of the actuator 110 extends when the closed circuit hydraulic system operates in the normal mode.

Referring to FIG. 4, in the normal mode, the control unit 500 controls the direction switch valve 600 so as to connect the charge pump 200 and the first accumulator 310 and controls the variable relief valve 400 so that the set pressure of the variable relief valve 400 is approximately 20 to 30 bar which is the predetermined pressure.

In this case, the supplement flow discharged from the charge pump 200 is supplied to the first accumulator 310, the excessive flow is discharged to the tank T through the variable relief valve 400, and the charge line 100 is maintained at the set pressure of the variable relief valve 400.

In addition, in the normal mode, when the cylinder of the actuator 110 extends, the discharge flow of the hydraulic pump 120 is supplied to a head of the cylinder and a high pressure is formed on the discharge line 140 side among the hydraulic lines 130 by a cylinder load.

A high-pressure pilot signal formed on the discharge line 140 side actuates the check valve 160 connected with a low-pressure supply line 150 among the hydraulic lines 130 between the pair of check valves 160 to connect the supply line 150 and the charge line 100, and as a result, the charge line 100 and the supply line 150 maintain the same pressure.

In this case, maximum thrust of the cylinder of the actuator 110 becomes a value acquired by subtracting force at the cylinder load side from force at the cylinder head side.

FIG. 5 is a diagram illustrating a state in which the cylinder of the actuator 110 extends when the closed circuit hydraulic system operates in the boost mode. Referring to FIG. 5, when the normal mode is changed to the boost mode in order to temporarily exert large force, the control unit 500 controls the direction change valve 600 so as to connect the charge pump 200 and the second accumulator 320 and controls the variable relief valve 400 to operate so that the set pressure of the variable relief valve 400 is at a pressure less than approximately 10 bar which is the pressure lower than the predetermined pressure.

In this case, the supplement flow discharged from the charge pump 200 is supplied to the second accumulator 320, the excessive flow is discharged to the tank T through the variable relief valve 400, and the charge line 100 is maintained at the set pressure lower than the predetermined pressure of the variable relief valve 400.

In addition, in the boost mode, when the cylinder of the actuator 110 extends, the discharge flow of the hydraulic pump 120 is supplied to the head of the cylinder and the high pressure is formed on the discharge line 140 side among the hydraulic lines 130 by the cylinder load.

The high-pressure pilot signal formed on the discharge line 140 side actuates the check valve 160 connected with the low-pressure supply line 150 among the hydraulic lines 130 between the pair of check valves 160 to connect the supply line 150 and the charge line 100, and as a result, the charge line 100 and the supply line 150 maintain the same pressure as the set pressure lower the predetermined pressure of the variable relief 400.

In this case, the maximum thrust of the cylinder of the actuator 110 becomes a value acquired by subtracting the force at the cylinder load side from the force at the cylinder head side and the force applied to the cylinder head side in the normal mode is the same as that in the boost mode, but the force applied to the cylinder load side in the boost mode is reduced to implement the boosting function.

That is, the variable relief valve 400 reduces pressure applied in an opposite direction to an extension direction of the cylinder which actuates each actuator 110, that is, the force applied to the cylinder load side to implement the boosting function to increase the thrust of the cylinder.

Meanwhile, when the cylinder extends in the closed circuit hydraulic system according to the exemplary embodiment of the present disclosure illustrated in FIGS. 4 and 5, the normal mode or the boost mode is described, but when the cylinder is contracted, contrary to this, a pressure applied in an opposite direction to a contraction direction of the cylinder, that is, the force applied to the cylinder head is reduced to implement the boosting function to increase the thrust of the cylinder.

In addition, while the implement of the boosting function is described in the closed circuit hydraulic system according to the exemplary embodiment of the present disclosure illustrated in FIGS. 4 and 5, the actuator 110 is provided as the cylinder as an example, but even when the actuator 110 is provided as the hydraulic motor, it is apparent that the closed circuit hydraulic system of the present disclosure is similarly actuated.

Further, according to the exemplary embodiment of the present disclosure, the accumulator 300 is divided into the first accumulator 310 and the second accumulator 320 and the direction switch valve 600 that controls the flow direction of the flow discharged from the charge pump 200 is provided, but since a core feature of the present disclosure is that the pressure applied in the opposite direction to the actuation direction of the cylinder or the hydraulic motor of each actuator 110 is reduced by varying the set pressure of the variable relief valve 400 to implement the boosting function, a single accumulator may be used and in this case, it is apparent that the direction switch valve need not be provided.

The exemplary embodiments of the present disclosure have been described hereinabove, but they are just illustrative, and it would be appreciated by those skilled in the art that various modifications and equivalent exemplary embodiments may be made therefrom. Accordingly, the true technical scope of the present disclosure should be defined by the appended claims.

DESCRIPTION OF MAIN REFERENCE NUMERALS OF DRAWINGS

100: Charge line
110: Actuator
120: Hydraulic pump
130: Hydraulic line
160: Check valve
200: Charge pump
300: Accumulator
310: First accumulator
320: Second accumulator
400: Variable relief valve
500: Control unit
600: Direction switch valve

The invention claimed is:

1. A closed circuit hydraulic system for a construction machine including a plurality of actuators and a plurality of hydraulic pumps selectively supplying working oil to the plurality of actuators bidirectionally, the system comprising:

a charge line selectively connected with a low-pressure side hydraulic line which returns to the hydraulic pump from the actuator among hydraulic lines connecting the hydraulic pumps and the actuators;

a charge pump supplying a supplement flow to the charge line;

a variable relief valve selectively changing a normal mode to limit a pressure of the charge line to a predetermined pressure or less and a boost mode to limit the pressure of the charge line to a pressure lower than the pressure of the charge line in the normal mode;

a pair of pilot check valves installed on the hydraulic lines in parallel so that the low-pressure side hydraulic line is in communication with the charge line by receiving a pilot signal from a high-pressure side hydraulic line among the hydraulic lines; and an accumulator provided on the charge line and storing an excessive flow among the supplement flow discharged from the charge pump or supplying an insufficient flow to the hydraulic lines connecting the hydraulic pumps and the actuators, wherein the accumulator includes a first accumulator storing the excessive flow among the supplement flow discharged from the charge pump or supplying the insufficient flow to the hydraulic line in the normal mode, and a second accumulator storing the excessive flow among the supplement flow discharged from the charge pump or supplying the insufficient flow to the hydraulic line in the boost mode, and having a lower discharge pressure than the first accumulator.

2. The closed circuit hydraulic system for a construction machine of claim 1, further comprising:

a direction switch valve controlled by the control unit so as to supply the supplement flow discharged from the charge pump to the first accumulator or the second accumulator.

* * * * *